No. 611,464. Patented Sept. 27, 1898.
J. BAER.
VESSEL FOR RETAILING AERATED BEVERAGES.
(Application filed June 22, 1898.)
(No Model.) 2 Sheets—Sheet 2.
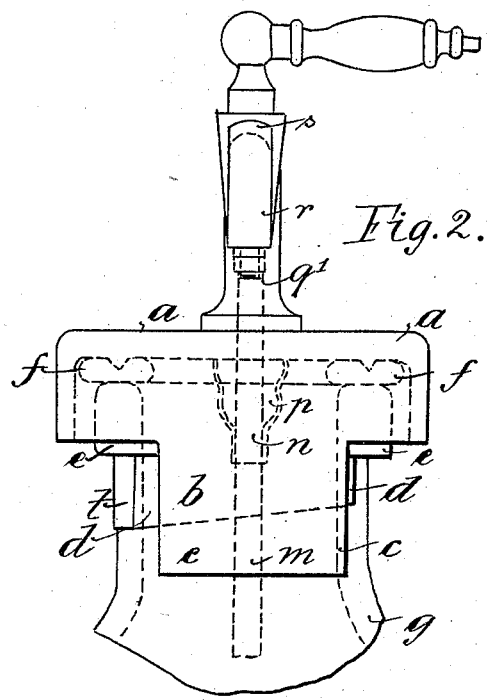
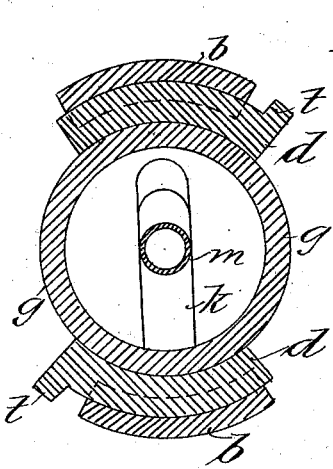
Witnesses:
Jas. A. Richmond
A. L. Donohoe
Inventor
Joseph Baer
by G. Dittmar
Attorney.

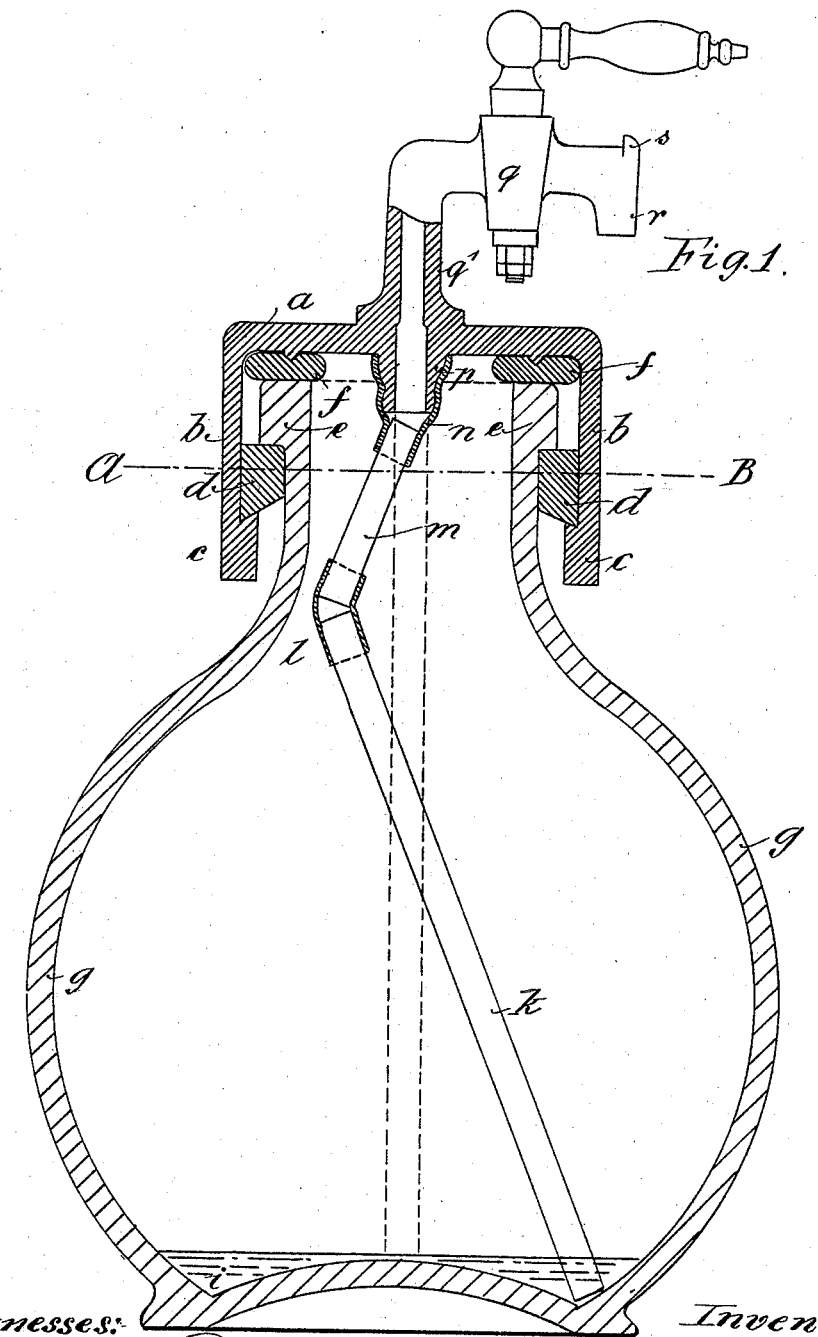

UNITED STATES PATENT OFFICE.

JOSEPH BAER, OF BERLIN, GERMANY.

VESSEL FOR RETAILING AERATED BEVERAGES.

SPECIFICATION forming part of Letters Patent No. 611,464, dated September 27, 1898.

Application filed June 22, 1898. Serial No. 684,156. (No model.)

*To all whom it may concern:*

Be it known that I, JOSEPH BAER, a subject of the Emperor of Germany, residing at Berlin, Germany, have invented certain new and useful Improvements in Vessels for Retailing Aerated Beverages, (for which I have applied for patents in the following countries, viz: Belgium, Denmark, England, France, Italy, Norway, Austria, Hungary, Sweden, Switzerland, and Germany,) of which the following is a full, clear, and exact specification.

Vessels at present in use for retailing aerated beverages have the disadvantage that they do not long remain gas-tight and, furthermore, do not admit of being completely emptied. The chief causes are the differences in the materials of the vessels, the flexibility of the packing, the numerous joints of the valves, screws, and the like, and, finally, the generally-curved form of the bottom of the vessel. To overcome these disadvantages is the object of the present invention, according to which for the purpose of securing a thoroughly gas-tight vessel no use is made of screws, valves, or the like. Moreover, the stopper or cover acts at the same time as air-valve when the liquid is being supplied to the vessel, while the outlet-cock serves also for the supply both of liquid and gas.

The usual forms of the vessels, particularly such as are of glass, as is necessary for beverages where there is to be a high internal pressure, have the bottom generally curved inwardly, and as a consequence the liquid collects in the channel $i$ round the bottom and cannot be withdrawn through the upright tube, situated in the center of the vessel. Furthermore, the differences in the heights of the various vessels and the flexibility of the packing material used for the stopper generally render it necessary to make the upright tube comparatively short in order that it may not come in contact with the bottom, and thus become closed. This, further, causes a certain amount of the contained liquid to remain undrawn in the vessel. In order to obviate all these drawbacks, the present vessel is provided with an enlargement or collar at the neck, on which the stopper described below and provided with a packing-ring is secured. The stopper is formed with two or more arms, which at their lower ends have angular notches or grooves. In the spaces formed between the stopper-arms and the neck of the vessel wedges are inserted, corresponding in thickness to the form of the collar of the particular vessel. By this means the stopper is caused to bear evenly on every part of the rim of the vessel. On the top of the stopper is an outlet for the liquid and on the under side is applied an upright tube, made in two or more parts, connected by a flexible joint and inclined at an angle to each other. The lower end of the upright tube is consequently independent of the pressure of the stopper and lies always against the lowest part of the bottom of the vessel.

On the accompanying drawings, Figure 1 shows a vertical section of the complete apparatus; Fig. 2, a side view of the stopper, seen at right angles to Fig. 1; and Fig. 3, a horizontal section through the wedges, taken on the line A B, Fig. 1.

The stopper $a$ is formed with lateral arms $b$, having inwardly-projecting ends $c$, into the notches in which the wedges $d$ fit, as above described. These wedges may, if desired, be formed with a lug $t$, Fig. 3, at one end to admit of readier insertion and withdrawal. The stopper $a$ is provided with a cock $q$, having at its mouth $r$ a nose $s$ for receiving the attachment of the connecting parts used in supplying the liquid or gas to the vessel. The form of this outlet, whether cock or valve, and of the attachment part, which may be a nose-piece, screwed socket, or the like, may be any desired. Likewise, instead of the form of stopper shown any other suitable closing means may be employed. Interiorly of the stopper is a short projection $p$, corresponding to the passage $q'$, for receiving the flexible tubing $n$, connecting it with the tube $m$. This tube $m$ is jointed by means of a like piece of flexible tubing $l$ to the tube $k$, lying at an angle to it $m$ $k$, together forming the upright tube referred to for drawing the beverage. The tube can, if desired, be formed of more than two parts, and instead of flexible rubber tubing ball-and-socket joints, elbow-pieces, or the like may be used.

The operation of the apparatus is as follows: After the parts have been put together, as shown in Fig. 1, the wedges are partly inserted, the connecting part of supply-reservoir of the fluid—for instance, beer—attached to the cock at $r$, and the beverage allowed to enter the vessel under gas-pressure until it reaches a certain level, the air in the vessel $q$ escaping through the stopper, which has not yet been made perfectly tight. The wedges are now, either by hand or machine, pressed fully into position, so that a close joint is made. The gas—for instance, carbonic acid—is then let into the remaining free space in the vessel in similar manner to the fluid. The apparatus is now ready for use for the retail of the beverage, which on opening the cock $q$, in consequence of the expansion of the gas under pressure, flows out through the vertical outlet $q'$.

Having now fully described my invention, what I claim as new, and desire to secure by Letters Patent of the United States, is—

A vessel for retailing aerated beverages or other liquids, comprising a stopper $a$ having two or more arms $b$ provided with inwardly-projecting notched ends $c$, pressed downward by the action of independent wedges, each movable axially to the center line of the vessel, and bearing against a collar or enlargement $e$ on the neck of said vessel and against the said notched arm ends, said stopper having fixed on it an outlet cock or valve $q$, serving also to admit both liquid and gas and being provided below with an upright tube consisting of two or more parts flexibly jointed together, all substantially as set forth.

In witness whereof I have hereunto set my hand in presence of two witnesses.

JOSEPH BAER.

Witnesses:
HENRY HASPER,
C. H. DAY.